United States Patent
Su et al.

(10) Patent No.: US 10,536,731 B2
(45) Date of Patent: Jan. 14, 2020

(54) TECHNIQUES FOR HDR/WCR VIDEO CODING

(71) Applicant: Apple Inc., Cupertino, CA (US)

(72) Inventors: Yeping Su, Sunnyvale, CA (US); Jiefu Zhai, San Jose, CA (US); Ke Zhang, San Jose, CA (US); Xiaosong Zhou, Campbell, CA (US); Hsi-Jung Wu, San Jose, CA (US); Chris Y. Chung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 762 days.

(21) Appl. No.: 14/710,520

(22) Filed: May 12, 2015

(65) Prior Publication Data

US 2015/0326896 A1    Nov. 12, 2015

Related U.S. Application Data

(60) Provisional application No. 61/992,198, filed on May 12, 2014.

(51) Int. Cl.
*H04N 19/50* (2014.01)
*H04N 21/2343* (2011.01)
(Continued)

(52) U.S. Cl.
CPC ... *H04N 21/234327* (2013.01); *H04N 19/184* (2014.11); *H04N 19/186* (2014.11);
(Continued)

(58) Field of Classification Search
CPC ..... H04N 21/234327; H04N 21/23406; H04N 21/23439; H04N 21/2385; H04N 21/4382;
(Continued)

(56) References Cited

U.S. PATENT DOCUMENTS 8,175,158 B2    5/2012 Segall
9,621,767 B1 *  4/2017 El Mezeni ............. H04N 1/648
(Continued)

FOREIGN PATENT DOCUMENTS

EP    2667610 A2    11/2013

OTHER PUBLICATIONS

Amon et al., "File Format for Scalable Video Coding", IEEE Transactions on Circuits and Systems for Video Technology, vol. 17, No. 9, Sep. 2007, pp. 1174-1185.
(Continued)

*Primary Examiner* — William C Vaughn, Jr.
*Assistant Examiner* — Jae N Noh
(74) *Attorney, Agent, or Firm* — BakerHostetler

(57) ABSTRACT

Systems and methods are provided for processing high quality video data, such as data having a higher than standard bit depth, a high dynamic range, or a wide or custom color gamut, to be compatible with conventional encoders and decoders without significant loss of quality. High quality data is encoded into a plurality of layers with a base layer having the standard quality data and one or more higher quality layers. Decoding systems and methods may map the base layer to the dynamic range or color gamut of the enhancement layer, combine the layers, and map the combined layers to a dynamic range or color gamut appropriate for the target display. Each of the standard quality and the high quality data may be encoded as a plurality of tiers of increasing quality and reference lower level tiers as sources of prediction during predictive coding.

26 Claims, 7 Drawing Sheets

(51) Int. Cl.
*H04N 21/234* (2011.01)
*H04N 21/2385* (2011.01)
*H04N 21/438* (2011.01)
*H04N 21/44* (2011.01)
*H04N 21/4402* (2011.01)
*H04N 19/186* (2014.01)
*H04N 19/184* (2014.01)

(52) U.S. Cl.
CPC ......... *H04N 19/50* (2014.11); *H04N 21/2385* (2013.01); *H04N 21/23406* (2013.01); *H04N 21/23439* (2013.01); *H04N 21/4382* (2013.01); *H04N 21/44004* (2013.01); *H04N 21/440227* (2013.01)

(58) Field of Classification Search
CPC ..... H04N 21/44004; H04N 21/440227; H04N 19/184; H04N 19/186; H04N 19/30; H04N 19/46; H04N 19/50
USPC .................................................... 375/240.26
See application file for complete search history.

(56) References Cited

U.S. PATENT DOCUMENTS

| | | | |
|---|---|---|---|
| 2007/0276954 A1* | 11/2007 | Chan | H04N 21/222 709/231 |
| 2010/0008427 A1* | 1/2010 | Chiu | H04N 1/64 375/240.18 |
| 2010/0014666 A1* | 1/2010 | Park | H04N 7/1675 380/210 |
| 2014/0037206 A1 | 2/2012 | Newton et al. | |
| 2012/0257824 A1 | 10/2012 | Jang | |
| 2013/0083203 A1* | 4/2013 | Barrett | H04L 43/0829 348/180 |
| 2013/0314495 A1* | 11/2013 | Chen | H04N 13/0048 348/43 |
| 2013/0329778 A1 | 12/2013 | Su et al. | |
| 2014/0072041 A1* | 3/2014 | Seregin | H04N 19/105 375/240.13 |
| 2015/0117551 A1* | 4/2015 | Su | H04N 19/44 375/240.27 |
| 2015/0156469 A1* | 6/2015 | Qu | H04N 9/8715 348/43 |

OTHER PUBLICATIONS

International Search Report and Written Opinion, dated Jul. 29, 2015, from corresponding International Application No. PCT/US2015/030405, filed May 12, 2015.
International Patent Application No. PCT/US2015/030405; Int'l Preliminary Report on Patentability; dated Nov. 24, 2016; 7 pages.

* cited by examiner

100

200

300

400

500 ics. Wide color gamut content, on the other hand, is content that is characterized by a larger representation of color information than is currently common in the industry, which is rather limited. In some applications it is even desirable to be able to represent the color gamut space that humans can perceive. These features can help in providing a more "lifelike" experience to the viewer.

TECHNIQUES FOR HDR/WCR VIDEO CODING

CROSS-REFERENCE TO RELATED APPLICATION

The present application claims the benefit of U.S. provisional application Ser. No. 61/992,198, filed May 12, 2014, entitled, "TECHNIQUES FOR HDR/WCR VIDEO CODING", the disclosure of which is incorporated herein by reference in its entirety.

BACKGROUND

The present invention relates to video coding techniques.

Video distribution systems include a video source and at least one receiving device. The video content may be distributed over a network, such as broadcast television, Over The Top (OTT) delivery, Internet Protocol Television (IPTV), etc., or over fixed media, such as Blu-ray, DVDs, etc. To keep complexity and cost low, video content is typically limited in dynamic range, e.g., 8-10 bit signal representations and 4:2:0 color format.

Recent advances in display technology, however, have opened the door for the use of more sophisticated content, including content characterized as High Dynamic Range (HDR) and/or wide color gamut (WCG), as well as content with increased spatial and/or temporal resolution. High Dynamic Range content is essentially characterized by an increased dynamic range, which is described as the ratio between the largest and smallest possible values that are represented in the signal. For video content, in particular, there is an interest in supporting content that can have values as small as 0.005 nits ($cd/m^2$), where the nit unit is a metric used to measure/specify luminance, up to 10000 nits in the entertainment space, whereas in other academic and scientific spaces lower and higher values are also of interest. Wide color gamut content, on the other hand, is content that is characterized by a larger representation of color information than is currently common in the industry, which is rather limited. In some applications it is even desirable to be able to represent the color gamut space that humans can perceive. These features can help in providing a more "lifelike" experience to the viewer.

Also, content providers are given more "artistic" flexibility because of the increased choices. This higher quality content is typically converted to a lower range using an Electro-Optical Transfer Function (EOTF) and color conversion before encoding for distribution using a video codec system.

However, although display technologies may be capable of displaying video data at a high dynamic range or with a wide color gamut, the decoder technology may be limited to a certain bit depth. Additionally, network bandwidth may limit the amount of data that can efficiently be transmitted between source and receiving devices. Furthermore, although some displays may be capable of displaying a high dynamic range or wide color gamut, many other displays are not. Characteristics of different displays vary, including black level, dynamic range and color gamut. For an encoder that is generating coded video data that may be received by one or more of a variety of different displays, it is important that the video data is compatible with whichever display receives that data, while maintaining the highest quality possible.

Therefore, the inventors perceived a need in the art for an improved encoding process capable of handling higher quality content that results in an improved experience at the decoder compared to conventional encoders while maintaining compatibility with current decoder and network limitations.

BRIEF DESCRIPTION OF THE DRAWINGS

The foregoing and other aspects of various embodiments of the present invention will be apparent through examination of the following detailed description thereof, in conjunction with the accompanying drawing figures in which similar reference numbers are used to indicate functionally similar elements.

DETAILED DESCRIPTION

Systems and methods according the embodiments described herein provide for processing high quality video data, such as data having a higher than standard bit depth, data having a high dynamic range, or data having a wide or custom color gamut, such that the data is compatible with conventional encoders and decoders without significant loss of quality. Embodiments described herein include systems and methods for encoding high quality data into a plurality of layers, for example a base layer having standard quality video data and an enhancement layer with data to reconstruct the high quality data. Decoding systems and methods may map the base layer to the dynamic range or color gamut of the enhancement layer, then combine the enhancement layer and the base layer and map the combined layers to a dynamic range or color gamut appropriate for the target display.

According to an embodiment, multiple enhancement layers may be used to achieve multiple different quality levels. Each of the standard quality data and the high quality data may be encoded as a plurality of tiers of increasing quality. Then higher level tiers may reference lower level tiers as sources of prediction during predictive coding.

According to an embodiment, metadata may be combined with the coded video data wherein the metadata provides data for mapping the high quality video data to one or more target displays. The metadata may include a mathematical transform for mapping the received video data to a target display.

According to an embodiment, the encoding and/or mapping functions may be adaptive to the content of the video data.

According to an embodiment, high quality video data may be encoded by transforming a frame of high quality video data, e.g. a frame with a bit depth of 16 bits, into one or more frames of video data that can be processed by a standard quality encoder or decoder. The frame may be transformed by separating the high quality frame into multiple frames of lower quality for encoding or by combining the separated frames into a single frame of higher quality but different resolution (e.g if the high quality frame has a resolution of H×W and the multiple frames each have a resolution of H×W, then the single frame combining two of the multiple frames will have a resolution of H×2 W).

Figure 1:
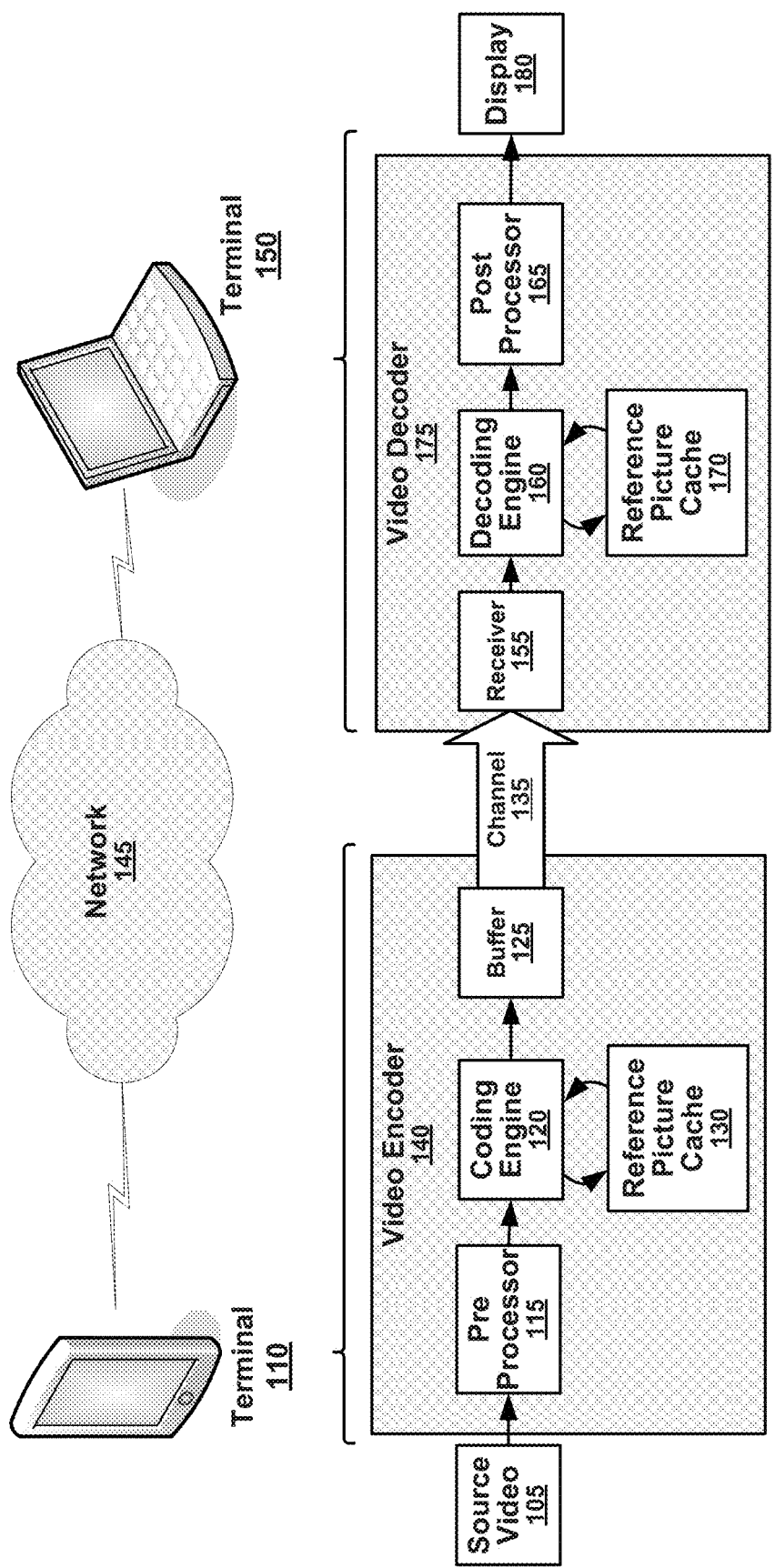
FIG. 1 is a simplified block diagram of a video coder/decoder system suitable for use with the present invention.

In video coding systems, an encoder may code a source video sequence into a coded representation that has a smaller bit rate than does the source video and, thereby achieve data compression. A decoder may then invert the coding processes performed by the encoder to retrieve the source video. FIG. 1 is a simplified block diagram of a video coder/decoder system 100 suitable for use with the present invention.

A video system may include terminals, 110, 150 that communicate via a network 145. The terminals each may receive video data locally and code the video data for transmission to another terminal via the network. Each terminal may receive the coded video data of the other terminal from the network, decode the coded data and display the recovered video data. Video terminals may include personal computers (both desktop and laptop computers), tablet computers, handheld computing devices, computer servers, television devices, media players and/or dedicated video conferencing equipment.

The encoder system 140 may include a pre-processor 115 that receives a sequence of source video data and performs pre-processing operations that condition the source video 105 for subsequent coding. Video pre-processing may be performed upon source video data to render video coding more efficient including by performing video processing operations on video frames such as de-noising filtering, bilateral filtering or other kinds of processing operations that improve efficiency of coding operations performed by the encoder.

An encoder system 140 may accept an HDR/WCG source video sequence 105, pre-process the source video 105, and may code the processed source video as coded video, which typically has a much lower bit rate than the source video. The encoding engine 120 may select from a variety of coding modes to code the video data, where each different coding mode yields a different level of compression, depending upon the content of the source video 105. Typically, the encoding engine 120 may code the processed source video according to a known protocol such as H.265, HEVC, H.264, MPEG-2 or MPEG-7. The coding engine 120 may code the processed source video according to a predetermined multi-stage coding protocol. Such video coding processes typically involve content prediction, residual computation, coefficient transforms, quantization and entropy coding. For example, common coding engines parse source video frames according to regular arrays of pixel data (e.g., 8×8 or 16×16 blocks), called "pixel blocks" herein, and may code the pixel blocks according to block prediction and calculation of prediction residuals, quantization and entropy coding.

A decoding engine (not shown) within the video encoder 140 may generate reconstructed video data for use as a basis for predictive coding techniques performed by the encoding engine 120. The reference frame cache 130 may store frame data that may represent sources of prediction for later-received frames input to the video coding system. Both the encoder system 110 and decoder system 120 may store reference frames. A buffer 125 may store the coded data and combine the coded data and any related metadata into a common bit stream to be delivered by the channel 135.

The encoder system 140 may output the coded video data to the channel 135, which may be a storage device, such as an optical, magnetic or electrical storage device, or a communication channel formed by computer network or a communication network for example either a wired or wireless network. A channel 135 may deliver the coded video data output from the coding engine to the decoder system 175. A decoder system 175 may retrieve the coded video data from the channel 135, invert the coding operations performed by the encoder system 140 and output decoded video data to an associated display device 180.

As shown the video communication system supports video coding and decoding in one direction only. For bidirectional communication, an encoder and decoder may each be implemented at each terminal 110, 150, such that each terminal may receive source video data locally and code the video data for transmission to the other terminal via the network 140. Each terminal may receive the coded video data of the other terminal from the network, decode the coded data and display video data recovered therefrom.

As shown in FIG. 1, a decoder system 175 may include a receiver 155 to receive the coded channel data and separate the coded video data from any received metadata, a decoding engine 160 to receive coded video data and invert coding processes performed by the encoding engine 120, a post-processor 165, and a display pipeline 180 that represents further processing stages (buffering, etc.) to output the final decoded video sequence to a display device.

According to an embodiment, parameters and metadata may be transmitted in logical channels established by the governing protocol for out-of-band data. As one example, used by the H.264 protocol, the decoder may receive noise parameters in a supplemental enhancement information (SEI) channel specified by H.264. In such an embodiment, the receiver 155 represents processes to separate the parameters and/or metadata from a logical channel corresponding to the SEI channel. However, when the present invention is to be used with protocols that do not specify such out-of-band channels, the receiver 155 may separate the parameters and/or metadata from the encoded video data by utilizing a logical channel within the input channel 135.

The decoding engine 122 may parse the received coded video data to recover the original source video data, for example by decompressing the frames of a received video sequence by inverting coding operations performed by the encoder 140. The decoding engine 160 may access a reference picture cache 170 to store frame data that may represent source blocks and sources of prediction for later-received frames input to the decoder system 175.

Figure 2:
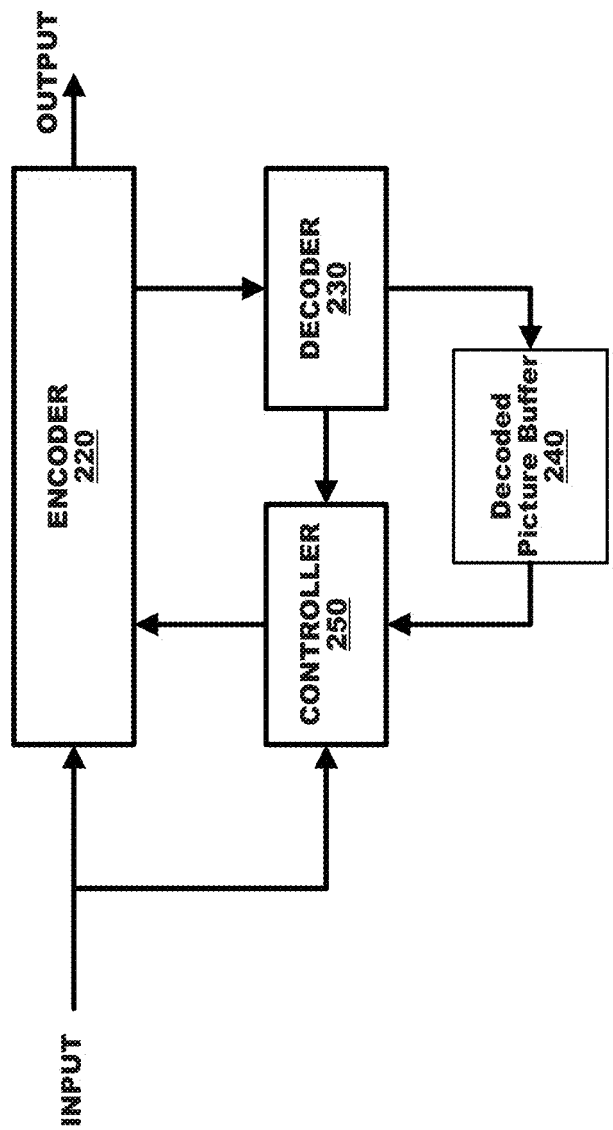
FIG. 2 is a simplified block diagram that illustrates an encoder system according to an embodiment of the present invention.

FIG. 2 is a simplified block diagram that illustrates an encoder system 200 according to an embodiment of the present invention. The encoder system 200 may include an encoder 220 to perform coding operations on the input signal. The encoder 220 may perform motion compensated predictive coding that exploits temporal and spatial redundancies in the video data.

According to an embodiment, the encoder 220 may include multiple coding engines. One coding engine may be configured to encode a base layer of video data while a second coding engine will be configured to encode one or more enhancement layers. According to an embodiment, a single coding engine will encode multiple layers of coded video data. For example, two (or more) signal representations may be generated including 1) a base layer representation corresponding to a lower representation of the signal, e.g. a lower dynamic range, resolution, frame-rate, bitdepth precision, chroma sampling, bitrate, etc. and 2) an enhancement layer representation, which may be added to or considered in conjunction with the first base layer representation to enable a higher quality, resolution, bitdepth, chroma format, or dynamic range experience compared to that of the base layer. In an embodiment, more than two signal representations may be generated. For example, multiple enhancement layers may be generated using the techniques described herein.

The scalable encoder system may employ a variety of schemes, such as the scalable extension of HEVC, or the SVC extension of AVC, two distinct AVC or HEVC encoders, etc. As described above, the base-layer output or enhancement-layer output, or both layer outputs may be improved using the techniques described herein. Further processing, such as the entire process of how these signals are used and/or combined together to generate the higher representation signal, may be taken into consideration for certain encoding steps, for example mode decision and motion estimation.

The encoder system 200 may additionally include a decoder 230 to decode the coded video data from the encoder 220. The decoder 230 may include a decoder picture buffer (DPB) 240 to store previously decoded pictures.

Additionally, a controller 250 may search the decoded picture data for image data to serve as a prediction reference for new frames to be coded by the forward transform coder 220. The controller may generate metadata that will inform a decoder of the characteristics of the video data. The controller may additionally select coding parameters such as slice type (e.g., I, P, or B slices), intra or inter (single or multi-hypothesis/bi-pred) prediction, the prediction partition size, the references to be used for prediction, the intra direction or block type, and motion vectors among others. The controller 250 may receive the original input signal as well as the decoded data, and may make its decisions accordingly.

The controller 250 may additionally instruct the encoder to develop multiple layers of scalably coded video data from the high quality source data. In a scalable coding system, a base layer bitstream can be decoded independently as a base representation of the signal. If an enhancement layer bitstream is also received at the decoder, a refined representation can be reconstructed jointly with the base layer. In the context of HDR/WCG coding, the base layer can be targeted at a given dynamic range and/or color gamut and the enhancement layer can be targeted at a different dynamic range and/or color gamut. For example, a first enhancement layer may be intended for displays with 1000 nits peak brightness, and a second enhancement layer intended for displays with 4000 nits peak brightness. The metadata associated with the second enhancement layer may include data for mapping to any display within the range from 1000 nits to 4000 nits.

To maintain the high quality of the source data in encoded data, the data of a single frame of video data may be separated into multiple frames having fewer bits or a lower resolution. For example, if the frames per second (fps) rate allows for the transmission of additional frames to the receiving device, the encoder may split the data of one frame of high quality video data (e.g. 16 bit video data) into two frames processed at a lower bit depth (e.g. two 8 bit frames of video data). To achieve this split, the video data would need to be pre-processed at the encoder 220 to properly separate the data and then post-processed at the decoder to properly combine the decoded data.

Alternatively, the high quality frame could be separated into multiple frames at a lower quality, and the frames transmitted to the encoding engine as a single frame with an alternate resolution. For example, a high quality frame having a resolution of H×W may be separated into two frames (each having a resolution of H×W) and then passed to the encoding engine as a single frame with the resolution H×2 W.

The controller 250 may encode the video data for display on a plurality of target displays including displays having more than one viewing mode or provided in different viewing conditions (e.g. viewing distance, ambient lighting, etc.). The encoder 220 may need to make trade-offs considering more than one target display when the HDR/WCG materials may be mapped to the range of displays. Most display variations can be modeled by mathematical transforms.

According to an embodiment, an encoder may consider multiple transforms in calculating an expected distortion in encoding decisions such as Rate-Distortion optimization (RDO). A coding mode that will result in an optimal level of distortion for the majority of potential display types may then be selected. Alternatively, a coding mode may be selected by weighting the modes that will provide the best quality for the most likely or most common display types.

Display statistics and user distribution can be collected and used in the calculation of the expected distortion. The encoder may have knowledge of the display and processing characteristics of the receiving device and the receiving device characteristics and conditions may be leveraged to make encoder decisions. For example, the encoder can weight different coding choices based on what's shown on the display side (e.g. not coding shadow details if the dark end will be crushed on the display, using a limited number of bits in areas that may not be seen at the decoder, utilizing additional bits in highlighted or other significant regions of the video data, incorporating display characteristics in computing distortion in RDO, etc.). Or the encoder can weight different coding choices based on environmental factors such as ambient lighting, distance of the closest viewer, minimum angle of incidence of the viewers (how far off-axis), etc.

The encoding system 200 of FIG. 2 provides improved performance over conventional systems that downsample or downconvert HDR or WCG video data before encoding by maintaining a higher quality of encoded video data. Therefore, the visual experience of the viewer is improved while the encoded data signal is made compatible with a conventional decoder.

Figure 3:
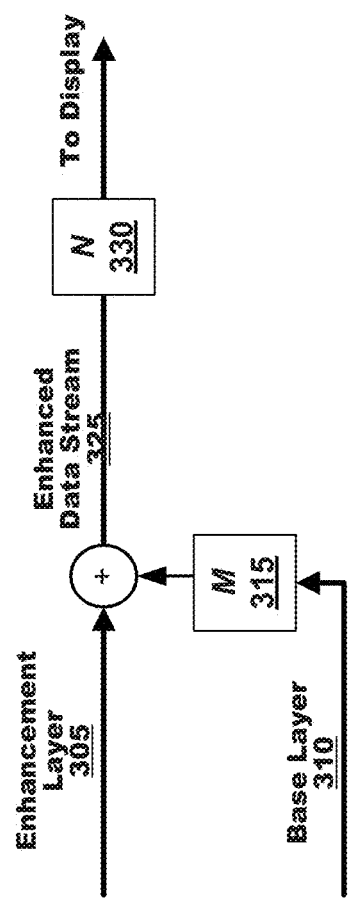
FIG. 3 is a simplified block diagram that illustrates an exemplary controller implemented as part of a scalable decoding system according to an embodiment of the present invention.

FIG. 3 is a simplified block diagram that illustrates an exemplary controller 300 implemented as part of a scalable decoding system according to an embodiment of the present invention. The controller may receive a decoded base layer 305, for example encoded at 100 nits and a decoded enhancement layer 310, for example encoded at 1000 nits, from a decoding engine (not shown). The signals may be combined during decoding with a first mapping (M) 315 that transforms the base layer 310 and then combining the transformed base layer with the enhancement layer 305 to generate a high quality signal 325 (e.g. at 1000 nits). Before display, a second mapping (N) 330 may occur at the controller that maps the high quality signal to the capabilities of the display. For example, the display may be capable of displaying a video signal at only 500 nits. Then the mapping (N) to the display will be a many-to-one mapping that maps the wide range of data provided to the more limited range data capable of being displayed. This mapping is conventionally called a tone mapping operation (TMO).

Metadata included with the encoded video data can include mapping information for a range of potential displays. For example, metadata can be paired with enhancement bitstreams for TMO mapping to displays having a range of display characteristics. The metadata provided with the encoded video signal to the decoder may guide the adaptation on the receiver/display side, mapping the decoded signal to the target display.

The metadata may provide custom mapping information. For example, the metadata may provide instructions for mapping decoded video data to a custom color range. Such a custom range may consider the source data (and potentially the source creator's instructions) to provide more detail in certain data ranges that maintain more shadow in the decoded video data, or maintain a certain level of highlighting in specified regions of the video frame.

In order to improve coding efficiency in a scalable decoder, inter-layer prediction is commonly employed to use low layer information to predict high layer signals. With a high quality signal, the inter-layer prediction can be defined as the inverse transform of the TMO. (e.g. $M=(N)^{-1}$) In the case where TMO is many to-one mapping, the inverse transform can be designed to provide guidance for the interlayer prediction to minimize the average prediction error.

Figure 4:
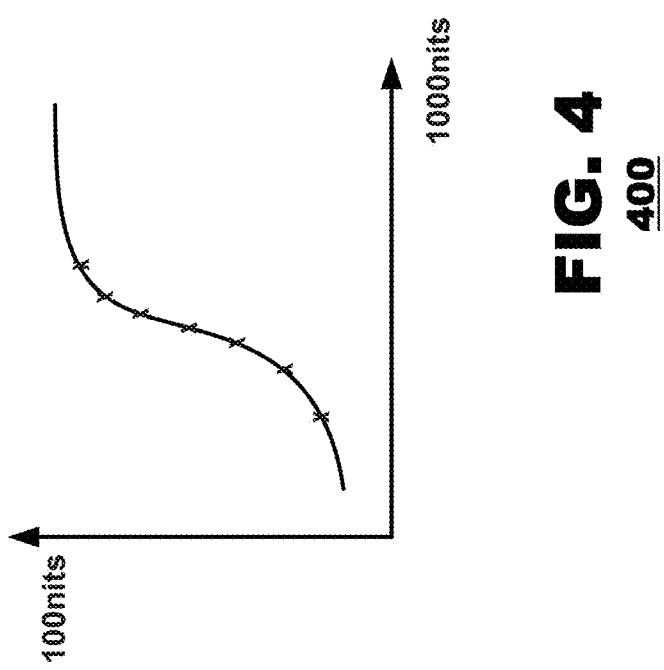
FIG. 4 is graph that illustrates an exemplary transform function for mapping from a high quality signal to a lower quality signal.

FIG. 4 is graph that illustrates an exemplary transform function for mapping from a high quality signal to a lower quality signal. According to an embodiment, although certain mapping points from a high quality signal to a low quality display may be predefined by the TMO, a controller at the decoder may interpolate between the defined points to achieve a higher quality display.

Figure 5:
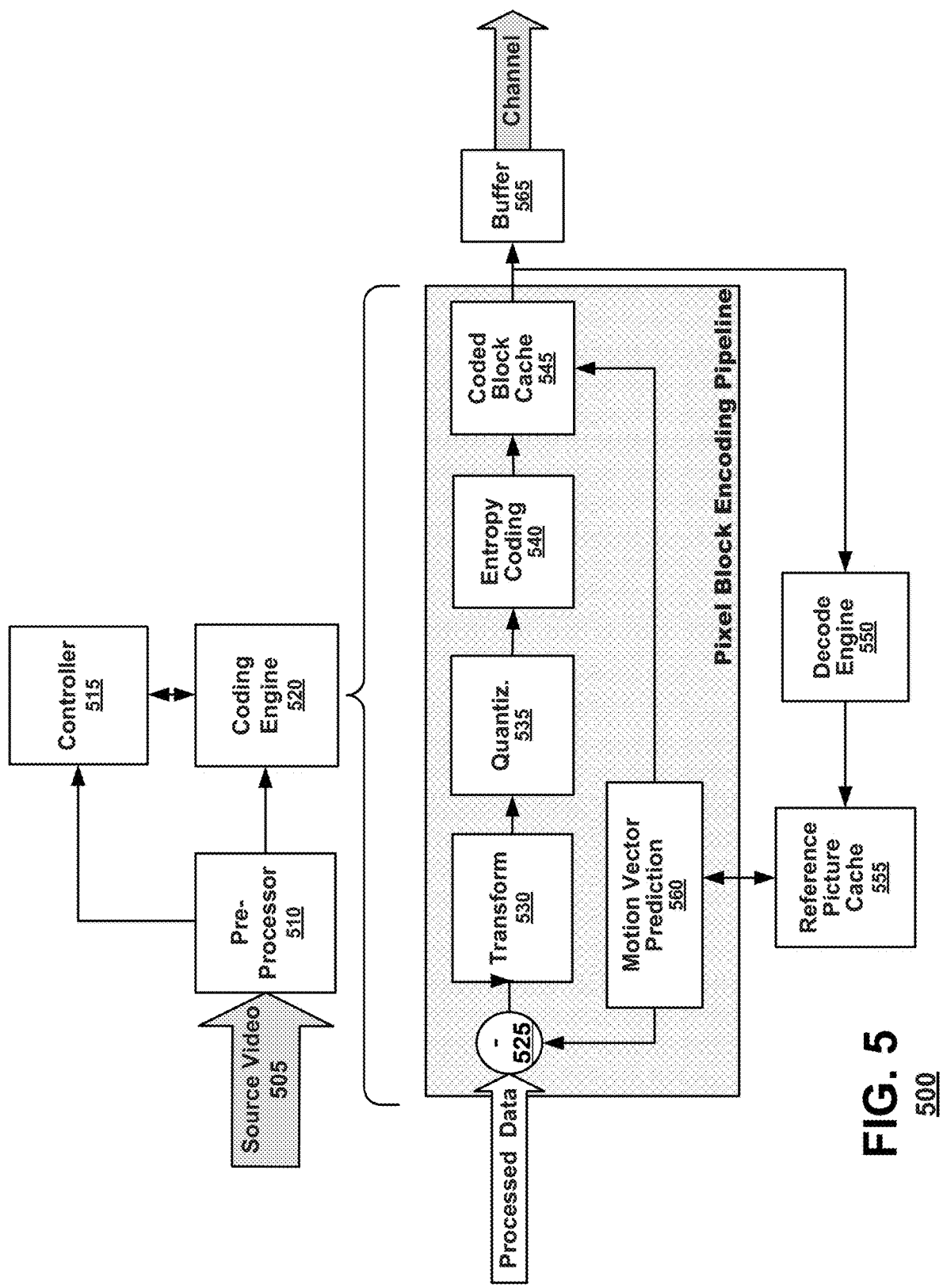
FIG. 5 is a simple block diagram that illustrates an encoder system 500 according to an embodiment of the present invention.

FIG. 5 is a simple block diagram that illustrates an encoder system 500 according to an embodiment of the present invention. In addition to the features and operations described above, the encoder system 500 may include a pre-processor 510 that receives a sequence of source video data 505 and performs pre-processing operations that condition the source video for subsequent coding.

The pre-processor 510 may act as an input pre-analyzer to derive information regarding the input video. For example, information regarding areas that may be considered more important than other areas may be derived.

An encoder controller 515 may receive information from the input pre-analyzer, and adjust coding decisions accordingly. For example, the coding decisions may include rate control quantization parameter decisions, mode decisions (or other decisions impacting mode decisions), motion estimation, de-blocking control etc. In an embodiment, quantization parameters may be allocated to areas based on the original input signal. This may improve quality if the quantization parameters are based on the original or target space rather than only the "in process" space.

A coding engine 520 will include an encoding pipeline to predictively encode the video data. The encoding pipeline may include a subtractor 525 to generate data representing a difference between a pre-processed source pixel block and a reference block developed for prediction. A transform unit 530 may convert the source pixel block data to an array of transform coefficients, as by a discrete cosine transform (DCT) process or wavelet transform. A quantizer unit 535 may quantize the transform coefficients obtained from the transform unit by a quantization parameter QP. An entropy coder 540 will then code the quantized coefficient data by run-value coding, run-length coding, arithmetic coding or the like. Coded data may be stored in a coded block cache 545. A decoded data buffer 565 to store previously decoded pictures until they are ready to be combined in a data stream and transmitted on a channel.

As part of the coding process, a video decoding engine 550 may decode the coded video data generated by the encoding engine 520. The decoding engine 550 may generate a decoded replica of the source video data that is the same as the decoded data that a decoder system at a receiving device (not shown) will generate. The decoded data can be used as a basis for predictive coding techniques performed by the encoding engine. The decoding engine 550 may access a reference picture cache 555 to store data that may represent sources of prediction for later-received input to the video coding system. Both the encoder and decoder may access reference pictures stored in a cache. However, due to constraints in buffer sizes, a limited number of reference pictures can be stored in the cache 555.

The encoding of system of FIG. 5 may operate as an adaptive coding system according to an embodiment of the present invention. In addition to the features and operations described above, an adaptive coding system may adjust the quality of an encoded video stream according to characteristics of the source data, network bandwidth and/or the processing capability of a target decoder.

Coding decisions made according to the adaptive processes described herein may be signaled to the decoder as metadata with the encoded video stream. Although primarily described with reference to an analysis of the source video data, other factors may be considered when making adaptive encoding decisions. For example, the resources of the encoder or target decoder and the available bandwidth of the network may be considered.

To create an adaptive video stream, video source data 505 may be coded at different tiers, for instance t01 to t10 with each tier increasing in bitrate and/or quality. According to an embodiment, to provide both bitrate scalability and display scalability, tiers of encoded video data at both standard dynamic ranges and high dynamic ranges may be provided.

Figure 6C:
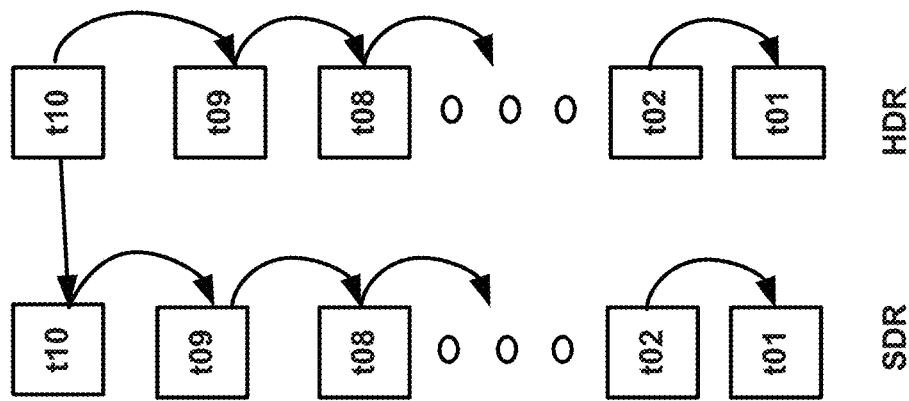
FIG. 6C illustrates an exemplary tiered structure with a tier referencing both data streams.
Figure 6B:
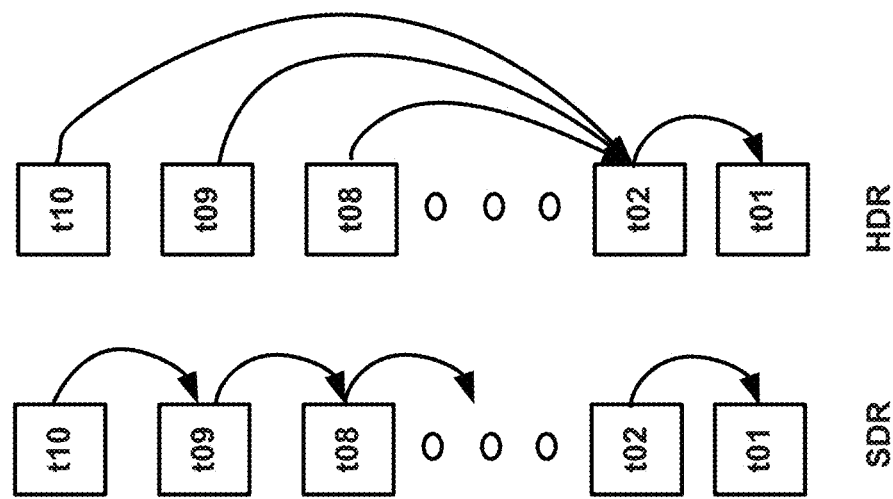
FIG. 6B illustrates an exemplary tiered structure with multiple tiers referencing an anchor tier.
Figure 6A:
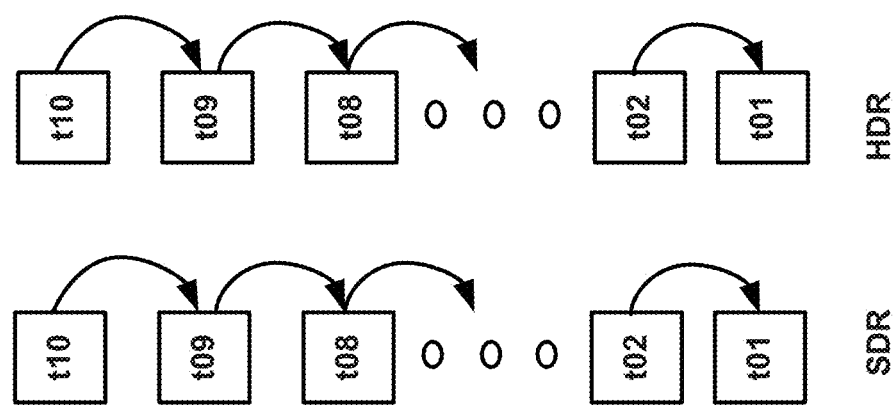
FIG. 6A illustrates an exemplary tiered structure with each tier referencing a tier immediately below.

A higher level tier may be encoded as an enhancement layer over a lower level tier. FIG. 6A illustrates an exemplary tiered structure with each tier referencing a tier immediately below. A receiving device will stream the standard dynamic range tiers only if the standard dynamic range video is all that the device needs or can handle. However, a receiving device can stream both the standard dynamic range tiers and the high dynamic range tiers to display HDR video.

Using the tiered structure, if there is a transmission error or bandwidth degradation, the receiving device can maintain an HDR display but drop down to a lower HDR tier. This will maintain a higher quality and be less jarring to the viewer than a sudden switch to SDR only. Tiers of HDR data may be pre-buffered before or during playback in order to maintain a higher quality display even in unstable bandwidth conditions.

According to an embodiment, HDR tiers can be coded using a scalable coder, for example, by predicting a higher tier (e.g. t09_hdr) using a lower tier (e.g. t08_hdr) as the prediction reference, with inter-layer prediction. According to an embodiment, HDR tiers can be coded with a scalable coder by encoding an HDR tier (e.g. t09_hdr) with inter-layer prediction using both standard and high dynamic range tiers (e.g. t09_sdr and t08_hdr) as source of prediction. According to an embodiment, several SDR tiers can share one HDR enhancement tier, for example t10_hdr can share the same SDR tier (e.g. t08_sdr) as t09_hdr for prediction.

According to an embodiment, a tier may be designated as an anchor tier. For example, if t05_hdr is designated as an anchor tier, multiple higher level tiers may be encoded with reference to t05_hdr, rather than each intermediate layer. FIG. 6B illustrates an exemplary tiered structure with multiple higher level tiers referencing an anchor tier. Although shown with only the HDR stream utilizing an anchor tier, either data stream, or both, may use an anchor.

According to an embodiment, an HDR tier may be coded with reference to both a lower HDR tier and one or more SDR tiers. FIG. 6C illustrates an exemplary tiered structure with a tier referencing both data streams. According to an embodiment, if the differences between the SDR and HDR tiers being utilized by the decoder are small, the decoder can switch to a lower HDR tier or stop using the HDR stream all together to save bandwidth and other decoding resources.

Encoding of the high quality source data may be informed by an analysis of the source data. Such information may be used to inform the coding decisions in both a scalable and single layer encoding system. The analysis may be used to adaptively adjust certain coding operations. A sliding window of video data, both forward and backward from the current video data, may be considered when making coding decisions.

For example, using information provided by the input analyzer, a particular region or area of the video data may be encoded at a higher data rate than the remaining portion of the video data. For example, an object or highlighted area of a video frame may be coded to utilize more bits than a less important or less significant region of the frame. The highlighted region(s) may then be included in an HDR enhancement layer whereas no HDR data may be transmitted for the less significant regions.

The transfer function and bit depth during quantization may additionally be adaptive to the qualities of the source data. The inverse EOTF of the coded signal can be made adaptive to the image content globally, as well as locally. When the transfer function is done globally, metadata will be signaled per picture or per scene to indicate the local curve used. When the transfer function is adjusted locally, a dedicated quad-tree may be signaled or the signaling may be embedded with the coding tree structure.

The bit depth of the coded signal can be adaptive as well. By analyzing the content, certain bits may be dropped from the input signal to save bits, and avoid coding noise. Bit depth can be switched by changing the bit depth of the codec, or by applying a quantization while maintaining the bit depth of the codec. For example, although the source video may have an absolute range of 1000 nits, the picture may have a smaller range of effective brightness (e.g. a 200 nit range). Then the majority of bits may be spent to resolve the smaller range rather than wasting bits encoding the unnecessary breadth of the potential range.

Additionally, the tone map may be altered to retain or recover more bit depth at the decoder. For data decoded using an alternative tone map or quantization spread, the reference data in the decoded picture buffer of the decoder may be converted to be consistent with the currently decoded video data when used as reference data for the currently decoded data.

Compression of high a bit-depth signal with lower bit-depth codec modules may be effected with an adaptive mapping between low dynamic range and high dynamic range data.

For example, using a pair of mappings that map between an HDR signal and an LDR signal, e.g.:

$$LDR=M(HDR)$$

$$HDR=IM(LDR)$$

where $M(\ )$ is a many-to-one mapping and $IM(\ )$ is a one-to-one mapping. The mapping can be made adaptive per-picture or per-region. The adaptive mapping for each picture or region may be signaled with look-up tables in the metadata stream. Region adaptive mapping can be signaled using a dedicated quad-tree, or on top of the coding tree structures.

A receiving device storing a previously received HDR stream, HDR_rec[t−1]/[t−2]/[t−3] . . . , may receive a low bit-depth bitstream along with metadata at time t. The receiving device may then reconstruct the HDR_rec[t], and can potentially keep LDR_rec[t]=M(HDR_rec[t]).

To reconstruct the HDR stream, for an inter-predicted block, the motion compensated predictor HDR_pred[t] is computed from HDR_rec[t-k], with high bit-depth. If there is no residue:

$$HDR\_rec[t]=HDR\_pred[t].$$

If there is residue:

$$HDR\_rec[t]=IM(M(HDR\_pred[t])+LDR\_rec[t])\ \text{or}$$

$$HDR\_rec[t]=HDR\_pred[t]+IM(LDR\_rec[t]))$$

For an intra-predicted block, the intra predictor HDR_pred[t] can be computed from neighboring blocks with high bit-depth. In this case the reconstruction of HDR_rec[t] is the same as above. Alternatively the intra predictor LDR_pred[t] can be computed in low bit-depth from LDR_rec[t] as:

$$HDR\_rec[t]=IM(LDR\_pred[t]+LDR\_rec[t])$$

According to an embodiment, a deblocking filter can operate on the high bit-depth data. According to an embodiment, a deblocking filter can accurately operate on the low bit-depth when engaged before the inverse mapping IMO.

Figure 7B:
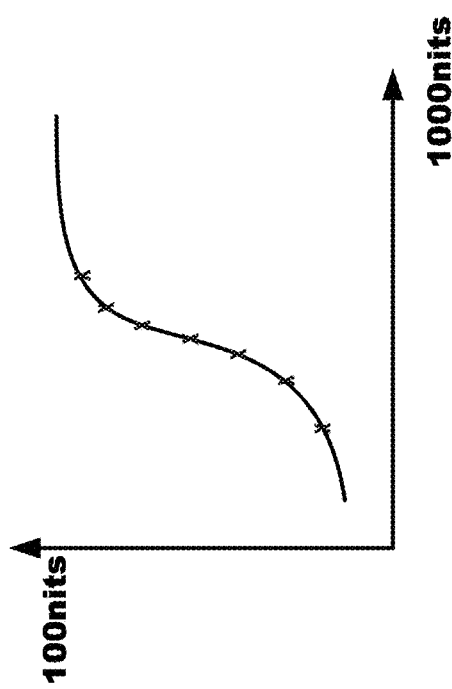
FIG. 7B is a simplified graph that illustrates a quantization spread according to an embodiment of the present invention where the mapping is more dense in certain areas than in other areas.
Figure 7A:
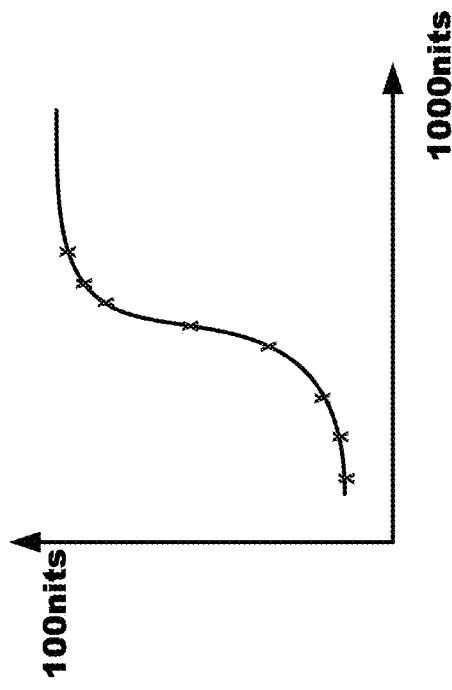
FIG. 7A is a simplified graph that illustrates a conventional uniform quantization spread.

According to an embodiment, to maintain a smaller bit depth, the bit depth of the quantization may be changed. For example, the quantization may be clustered or non-uniformly spread to accommodate a wider span of data ranges. The adjusted quantization may have better gradation in the smaller ranges where small changes will be noticeable. Then interpolation may be effective for larger regions. According to an embodiment, this will squeeze a larger signal into a small bit depth. FIGS. 7A-7B are simplified graphs illustrating an exemplary quantization adjustment. FIG. 7A illustrates a conventional uniform quantization spread. FIG. 7B illustrates a quantization spread according to an embodiment of the present invention where the mapping is more dense in certain areas than in other areas.

Motion may also be considered when making coding decisions. For example, small details and changes will not be noticeable in regions that exhibit high motion. Then the adaptive coding options may be limited for these regions as certain details need not be encoded to maintain the high quality of the source data.

There are different ways of signaling quantization parameters locally, to achieve adaptivity. The reconstruction can be expressed as Y=IQ(X, params), where X is a quantized codeword, IQ( ) performs the inverse quantization, and Y is the reconstructed pixel value. Then linear models for the quantization include: $Y(x,j)=a(i,j)*X(i,j)+b(i,j)$. Nonlinear functions may also be used, for example, $Y(i,j)=a(i,j)/(1+^{X(i,j)+e(i,j)})+b(i,j)$ or a piece-wise function model such as $Y(i,j)=f(X(i,j), params(k))$ if $X(i,j)$ falls into a range delineated by two thresholds: $th_k<X(i,j)<=th_{k+1}$ According to an embodiment, inverse EOTF and variable bit depth processing may be completed as part of pre-processing. Then information regarding these steps may be passed to the encoder to influence coding decisions. By applying adaptive quantization, the encoder may consider the total loss introduced by both the encoding process and the quantization process. For instance Distortion($Src_Y$, $Rec_Y$)= MSE($Src_Y$, IQ(X)). Such calculation can be simplified as a function of MSE($Src_X$, X) such as MSE($Src_X$, X)*a(X), which is cheaper to compute.

As discussed above, FIGS. 1, 2, 3, and 5 illustrate functional block diagrams of terminals. In implementation, the terminals may be embodied as hardware systems, in which case, the illustrated blocks may correspond to circuit sub-systems. Alternatively, the terminals may be embodied as software systems, in which case, the blocks illustrated may correspond to program modules within software programs. In yet another embodiment, the terminals may be hybrid systems involving both hardware circuit systems and software programs. Moreover, not all of the functional blocks described herein need be provided or need be provided as separate units. For example, although FIG. 1 illustrates the components of an exemplary encoder, such as the pre-processor 115 and coding engine 120, as separate units, in one or more embodiments, some components may be integrated. Such implementation details are immaterial to the operation of the present invention unless otherwise noted above.

Similarly, the encoding, decoding, artifact estimation and post-processing operations described herein may be performed continuously as data is input into the encoder/decoder. The order of the steps as described above does not limit the order of operations. For example, depending on the encoder resources, the source noise may be estimated at substantially the same time as the processed source video is encoded or as the coded data is decoded. Additionally, some encoders may limit the detection of noise and artifacts to a single step. For example, by only estimating the artifacts present in the recovered data as compared to the source data, or only by using the coding statistics to estimate noise.

The foregoing discussion demonstrates dynamic use of stored noise patches to mask visual artifacts that may appear during decoding of coded video data. Although the foregoing processes have been described as estimating a single instance of artifacts in coded video, the principles of the present invention are not so limited. The processes described hereinabove may identify multiple instances of artifacts whether they be spatially distinct in a common video sequence or temporally distinct or both.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A video decoding method, comprising:
   receiving a base layer and a first enhancement layer of video data at a decoder, the base layer encoded in one or more tiers containing video content with a low dynamic range or small color gamut and the first enhancement layer encoded in one or more tiers containing video content with a high dynamic range or a wide color gamut, and the enhancement layer encoded as a plurality of tiers including an anchor tier, each higher tier increasing in bitrate or quality over a previous lower tier, wherein each higher tier is coded as an enhancement of another encoded tier and a plurality of tiers are coded as an enhancement of the anchor tier;
   deriving a first prediction of a higher tier of the first enhancement layer from the anchor tier of the first enhancement layer;
   deriving a second prediction of the higher tier of the first enhancement layer from the base layer by mapping the base layer to the dynamic range or color gamut of the first enhancement layer;
   decoding the higher tier of the first enhancement layer by combining the first prediction and the second prediction;
   mapping pixel values of the decoded higher tier of the first enhancement layer to a dynamic range or color gamut appropriate for a target display, wherein the mapping includes a tone mapping; and
   displaying the decoded higher tier of the first enhancement layer transformed by the mapping on the target display.

2. The method of claim 1, further comprising: receiving a second enhancement layer of video data at the decoder, the second enhancement layer containing video content with a high dynamic range or wide color gamut greater than the dynamic range or color gamut of the first enhancement layer.

3. The method of claim 2, further comprising: receiving with the second enhancement layer metadata that provides data for mapping the received enhancement layers to any display that has dynamic range or color gamut characteristics between the first enhancement layer and the second enhancement layer.

4. The method of claim 1, further comprising: receiving at the decoder metadata that provides data for mapping high dynamic range or wide color gamut video data to the target display.

5. The method of claim 4, wherein the metadata includes instructions for mapping the received video data to a custom color range.

6. The method of claim 4, wherein the metadata includes reshaping instructions for mapping the combined layers to a full dynamic range of the target display.

7. The method of claim 1, wherein the base layer containing video data at a low dynamic range or small color gamut is encoded as a plurality of tiers, each higher tier increasing in bitrate or quality over a previous lower tier, wherein each higher tier is coded as an enhancement of a previous tier.

8. The method of claim 1, wherein the first enhancement layer containing video data at a high dynamic range or wide color gamut is encoded as a plurality of tiers, each higher tier increasing in bitrate or quality over a previous lower tier, wherein each higher tier is coded as an enhancement of a previous tier.

9. The method of claim 8, wherein a higher tier is encoded with reference to a lower level tier as a source of prediction during predictive coding.

10. The method of claim 8, wherein a higher tier of the enhancement layer is encoded with reference to both a lower level tier of the enhancement layer and data in the base layer as sources of prediction during predictive coding.

11. The method of claim 8, wherein a lower level tier of a layer is an anchor tier and a plurality of higher tiers of the layer are coded with reference to the anchor tier as a source of prediction during predictive coding.

12. The method of claim 1, wherein said mappings are adaptive to the content of the video data.

13. A video decoder, comprising:
a buffer to receive a base layer and a first enhancement layer of coded video data, the base layer containing video content with a low dynamic range or small color gamut and the first enhancement layer containing video content with a high dynamic range or a wide color gamut, and the enhancement layer coded as a plurality of tiers including an anchor tier, each higher tier increasing in bitrate or quality over a previous lower tier, wherein each higher tier is coded as an enhancement of another coded tier and a plurality of tiers are coded as an enhancement of the anchor tier;
a decoding engine configured to decode the coded video data; and
a controller configured to
derive a first prediction of a higher tier of the first enhancement layer from the anchor tier of the first enhancement layer,
derive a second prediction of the higher tier of the first enhancement layer from the base layer by mapping the base layer to the dynamic range or color gamut of the first enhancement layer,
decode the higher tier of the first enhancement layer by combining the first prediction and the second prediction, and
tone map pixel values of the decoded higher tier of the first enhancement layer to a dynamic range or color gamut appropriate for a target display.

14. The video decoder of claim 13, further comprising: receiving at the decoder metadata that provides data for mapping high dynamic range or wide color gamut video data to the target display.

15. The video decoder of claim 13, wherein the base layer containing video data at a low dynamic range or small color gamut is encoded as a plurality of tiers, each higher tier increasing in bitrate or quality over a previous lower tier, wherein each higher tier is coded as an enhancement of a previous tier.

16. The video decoder of claim 13, wherein the first enhancement layer containing video data at a high dynamic range or wide color gamut is encoded as a plurality of tiers, each higher tier increasing in bitrate or quality over a previous lower tier, wherein each higher tier is coded as an enhancement of a previous tier.

17. The video decoder of claim 16, wherein a lower level tier is an anchor tier and a plurality of higher tiers are coded with reference to the anchor tier as a source of prediction during predictive coding.

18. The video decoder of claim 13, wherein the mapping the combined layers includes adaptively mapping the received video content between a high dynamic range and a lower dynamic range on a picture level.

19. The video decoder of claim 13, wherein the mapping the combined layers includes adaptively mapping the received video content between a high dynamic range and a lower dynamic range on a region level.

20. The video decoding method of claim 1, wherein the enhancement layer is encoded as a plurality of tiers such that when there is a change in the operating conditions at the decoder, the combining the enhancement layer and the base layer is carried out by selecting a tier of the enhancement layer that maintains the same level of display quality as the mapped combined layer prior to the change.

21. The video decoding method of claim 20, wherein the change is a transmission error or bandwidth degradation.

22. The video decoding method of claim 1, wherein the mapping the combined layers includes a many-to-one mapping to adapt the dynamic range or the color gamut to that of the target display.

23. The video decoder of claim 13, wherein the enhancement layer is encoded as a plurality of tiers such that when there is a change in the operating conditions at the decoder, the combining the enhancement layer and the base layer is carried out by selecting a tier of the enhancement layer that maintains the same level of display quality as the mapped combined layer prior to the change.

24. The video decoder of claim 23, wherein the change is a transmission error or bandwidth degradation.

25. The video decoder of claim 13, wherein the controller is configured to map the combined layers based on a many-to-one mapping to adapt the dynamic range or the color gamut to that of the target display.

26. A non-transitory computer readable memory storing instructions that, when executed by a processor, cause:
receiving a base layer and a first enhancement layer of video data at a decoder, the base layer encoded in one or more tiers containing video content with a low dynamic range or small color gamut and the first enhancement layer encoded in one or more tiers containing video content with a high dynamic range or a wide color gamut, and the enhancement layer encoded as a plurality of tiers including an anchor tier, each higher tier increasing in bitrate or quality over a previous lower tier, wherein each higher tier is coded as an enhancement of another encoded tier and a plurality of tiers are coded as an enhancement of the anchor tier;
deriving a first prediction of a higher tier of the first enhancement layer from the anchor tier of the first enhancement layer;

deriving a second prediction of the higher tier of the first enhancement layer from the base layer by mapping the base layer to the dynamic range or color gamut of the first enhancement layer;

decoding the higher tier of the first enhancement layer by combining the first prediction and the second prediction;

mapping pixel values of the decoded higher tier of the first enhancement layer to a dynamic range or color gamut appropriate for a target display, wherein the mapping includes a tone mapping; and displaying the decoded higher tier of the first enhancement layer transformed by the mapping on the target display.

* * * * *